(12) United States Patent
Wagaman

(10) Patent No.: US 6,258,983 B1
(45) Date of Patent: Jul. 10, 2001

(54) METHOD OF PREPARING SOLID HYDROXYLAMINE NITRATE

(75) Inventor: Kerry L. Wagaman, Bryantown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/686,894

(22) Filed: Oct. 12, 2000

(51) Int. Cl.⁷ .................................................. C07C 293/08
(52) U.S. Cl. ............................................ 564/300; 564/301
(58) Field of Search ..................... 564/300, 301

(56) References Cited

U.S. PATENT DOCUMENTS

| | | |
|---|---|---|
| 3,313,595 | 4/1967 | Jockers et al. ........................ 23/117 |
| 3,420,621 | 1/1969 | Watters et al. ........................ 23/85 |
| 3,508,864 | 4/1970 | Thompson et al. ................... 23/85 |
| 3,695,834 | 10/1972 | Wheelwright et al. ............... 423/395 |
| 4,778,669 | 10/1988 | Hugo et al. ........................... 423/387 |
| 4,954,328 | 9/1990 | Wagaman .............................. 423/386 |
| 4,956,168 | 9/1990 | Wagaman .............................. 423/386 |
| 5,041,661 | 8/1991 | Wagaman et al. .................... 564/227 |

*Primary Examiner*—Johann Richter
*Assistant Examiner*—Sikarl A. Witherspoon
(74) *Attorney, Agent, or Firm*—Mark Homer

(57) ABSTRACT

The present invention comprises a process of producing HAN by slowly adding nitric acid to an alcoholic solution of hydroxylamine. This forms a precipitate of solid HAN. However, if more nitric acid is added, the precipitate dissolves before the stoichiometric amount of acid has been added. Therefore, sufficient nitric acid is added to form a maximum amount of solid HAN precipitate. The solid HAN is then isolated by conventional means such as filtration or centrifugation, possibly preceded by chilling this solution. The excess alcoholic solution of unreacted hydroxylamine may be recycled and used as starting material in the process.

10 Claims, No Drawings

METHOD OF PREPARING SOLID HYDROXYLAMINE NITRATE

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates to inorganic synthesis techniques and more particularly to the inorganic synthesis of energetic oxidizer salts.

2. Description of the Related Art

Hydroxylamine nitrate (HAN) has been produced commercially by electrochemical treatment of nitric acid, by aqueous ion displacement, and by ion exchange. When using any of these synthesis methods, the product is an aqueous solution of HAN. A time and energy consuming vacuum evaporation of water technique is necessary to extract solid HAN from the solution. The water from such an aqueous solution of HAN becomes more difficult to remove as the HAN concentration increases. This requires ever increasing vacuum and temperature conditions to complete the extraction process. These operating conditions make a processing plant vulnerable to an accident; the loss of vacuum or an air leak would result in air mixing with the hot HAN solution, causing a fume-off and possibly a detonation. Addition of an alcohol or other solvent which forms a water azeotrope can improve the water removal and reduce the danger of an accident. However, the process remains difficult, expensive, and dangerous.

Other HAN production techniques involve the reaction of hydroxylamine sulfate with various reagents to produce an aqueous or an alcoholic solution of hydroxylamine which is then neutralized with nitric acid to produce a solution of HAN. Examples of these methods are found in U.S. Pat. Nos. 4,954,328 and 4,956,168. As with the method above, these processes produce solutions of HAN and not HAN salt. Hazardous, energy expensive processes of distillation or evaporation are still required to isolate the salt from solution.

Therefore, it would be desirable to provide a simpler, safer, less expensive method of producing HAN salt.

SUMMARY OF THE INVENTION

This invention comprises a process of producing solid HAN by slowly adding nitric acid to an alcoholic solution of hydroxylamine.

Accordingly, an object of this invention is to provide a new method of producing solid HAN.

Another object of this invention is to provide a more economical, less hazardous way of producing solid HAN.

A further object of this invention is to provide a method of producing solid HAN without the use of distillation or evaporation steps.

This invention accomplishes these objectives and other needs related to improvement of venting heat from combustion gases in a rocket motor.

DESCRIPTION OF THE PREFERRED EMBODIMENT

The invention, as embodied herein, comprises a process of producing HAN by slowly adding nitric acid to an alcoholic solution of hydroxylamine. This forms a precipitate of solid HAN. However, if more nitric acid is added, the precipitate dissolves before the stoichiometric amount of acid has been added. Therefore, just enough nitric acid is added to form a maximum amount of solid HAN precipitate. The solid HAN is then isolated by conventional means such as filtration or centrifugation. The excess alcoholic solution of unreacted hydroxylamine may be recycled and used as starting material in the process.

The dissolution of the solid HAN discussed above by adding excess nitric acid results from the presence of water in the nitric acid solution. Thus, using a higher concentration solution of nitric acid, such as 90% versus 60%, of nitric acid will result in a higher recovery yield of solid HAN.

Alternatively, the nitric acid could be used to partially or totally neutralize the alcoholic solution of hydroxylamine resulting in a HAN-alcohol-water slurry. This slurry could be chilled below the solubility point of HAN and the crystalline HAN could be recovered through filtration.

The alcoholic solutions of hydroxylamine can be prepared by reaction of hydroxylamine sulfate and ammonia as disclosed in U.S. Pat. No. 4,956,168, titled "Synthesis of Hydroxylamine Salts," issued to Kerry L. Wagaman on Sep. 11, 1990, hereby incorporated by reference in its entirety. The alcoholic solutions of hydroxylamine can also be prepared by the reaction of hydroxylamine sulfate with an alkali metal alkoxide such as sodium methoxide or sodium ethoxide as disclosed in U.S. Pat. No. 4,954,328, titled "Synthesis of Hydroxylamine Salts," issued to Kerry L. Wagaman on Sep. 4, 1990, hereby incorporated by reference in its entirety. Other methods of preparing the alcoholic solutions of hydroxylamine may be used, however, lower alcohols of from 1 to 3 carbon atoms are preferable. Methanol, ethanol, or a mixture thereof are most preferable.

The nitric acid is an aqueous solution which has a HNO3 concentration of preferably from about 60% by weight to about 90% by weight and more preferably from about 60% by weight to about 72% by weight. The preferred concentrations are commercially available and would have fewer side reactions.

During the reaction, both the time when the crystalline HAN begins to precipitate and when it subsequently redissolves in the alcohol-hydroxylamine-water mixture are dependent on the concentrations of the hyroxylamine, hydroxylamine nitrate, alcohol, and water. In addition, the times depend on the temperature of the reaction mixture and the alcohol used. By proper selection of the concentration of the hydroxylamine solution and of the nitric acid solution, this chemical process may proceed as either a batch or continuous process.

The initial concentration of the alcoholic hydroxylamine solution is preferably from about 10% by weight to about 15% by weight and more preferably from about 14% by weight to about 15% by weight hydroxylamine with the remainder of the solution being ethanol. Another preferred embodiment has the initial concentration of the alcoholic hydroxylamine solution from about 15% by weight to about 35% by weight and more preferably from about 25% by weight to about 35% by weight with the remainder of the solution being methanol.

The nitric acid is an aqueous solution of HNO3, wherein the solution contains from about 60% by weight to about 90% by weight HNO3 and more preferably 60% by weight to about 72% by weight HNO3 with the remainder being water.

During the addition of the nitric acid solution to the alcoholic hydroxylamine solution, the solution temperature is preferably kept below 55° C. and more preferably below 20° C. The solution is also preferably agitated during the addition of the acid to prevent localized overheating.

The general nature of the invention having been set forth, the following examples are presented as specific illustrations thereof. It will be understood that the invention is not limited to these specific examples, but is susceptible to various modifications that will be recognized by one of ordinary skill in the art.

For all of the following examples, tables 1 and 2 show the freezing points of aqueous solutions of methanol and of aqueous solutions of ethanol. Table 3 lists the solubility of hydroxylamine of 35% by weight and 15% by weight in anhydrous methanol and ethanol solutions at the respective temperatures of 5° C. and 15° C. Table 4 shows the freezing points and solution densities for various HAN-ethanol-water slurries. Although specific amounts of substances are used in the below examples, one skilled in the art could use tables 1–4 and the invention disclosed herein to obtain varying results as necessary.

TABLE 1

Freezing Points of Methanol-Water Mixtures
(From Ewert M., Bull. Soc. chim. (Belg), 46, 90 (1937))

| % methanol | 8.6 | 23.7 | 37.2 | 48.9 | 59.3 | 64 | 68.5 | 72.7 | 77.5 | 80.6 | 82.1 | 87.7 | 91.6 | 100 |
|---|---|---|---|---|---|---|---|---|---|---|---|---|---|---|
| Freezing Pt. ° C. | −5 | −20 | −35 | −52.5 | −72 | −85 | −104.5 | −105.5 | −110 | −117.5 | −125 | −117 | −110 | −98 |

TABLE 2

Freezing Points of Ethanol-Water Mixtures
(From Pickering G. U., Chem. Soc., 63, 463, 996 (1893); 67, 669 (1895))

| % ethanol | 5 | 10 | 20 | 30 | 40 | 50 | 60 | 70 | 80 | 85 | 90 | 92.5 | 95 | 100 |
|---|---|---|---|---|---|---|---|---|---|---|---|---|---|---|
| Freezing Pt. ° C. | −2 | −4.5 | −11 | −20.5 | −30.5 | −38 | −43.5 | −50.5 | −67 | −87.5 | −113 | −125 | −120 | −115 |

TABLE 3

Solubility of Hydroxylamine in Various Solvents
(From DeBruyn C., Z. Physik. Chem., 10, 781 (1892))

| Solvent | Methanol | Ethanol | Diethyl Ether | Ethyl Acetate |
|---|---|---|---|---|
| Temp. ° C. | 5 | 15 | 34.6 | 77.1 |
| Solubility % wt. | 35.0 | 15.0 | 1.2 | 1.6 |

TABLE 4

Hydroxylamine Saturation Concentration in
Various Aqueous Ethanol Solutions

| Initial Ethanol Conc. | Hydroxyalmine, % wt. | Solution Density, g/cc | Freezing Pt. ° C. |
|---|---|---|---|
| 100 | 3.9 | 0.807 | −8 |
| 100 | 7.1 | 0.816 | 3 |
| 100 | 9.8 | 0.824 | 10 |
| 100 | 12.3 | 0.831 | 14 |
| 93.5 | 3.0 | 0.814 | −28 |
| 93.5 | 5.4 | 0.820 | −10 |
| 93.5 | 7.7 | 0.826 | −5 |
| 93.5 | 10.2 | 0.832 | 0 |
| 93.5 | 11.6 | 0.834 | 4 |
| 90 | 5.0 | 0.823 | −26 |
| 90 | 7.1 | 0.825 | −17 |
| 90 | 9.2 | 0.827 | −8 |
| 84 | 5.0 | 0.835 | −30 |
| 84 | 7.0 | 0.836 | −18 |
| 84 | 9.1 | 0.842 | −12 |
| 84 | 10.0 | 0.855 | 0 |
| 84 | 13.5 | 0.866 | −18 |

EXAMPLE 1

Neutralize 100 grams of 35% by weight hydroxylamine in methanol solution with 70% by weight nitric acid. The resulting HAN-methanol-water slurry contains 101.8 grams of crystalline HAN and 110.0 grams of 79.4% by weight methanol solution.

EXAMPLE 2

Neutralize 100 grams of 35% by weight hydroxylamine in methanol solution with 70% by weight nitric acid. The resulting HAN-methanol-water slurry contains 101.8 grams of crystalline HAN and 72.4 grams of 89.8% by weight methanol solution.

EXAMPLE 3

Neutralize 100 grams of 15% by weight hydroxylamine in ethanol solution with 70% by weight nitric acid. The resulting HAN-ethanol-water slurry contains 43.6 grams of crystalline HAN and 97.3 grams of 87.4% by weight ethanol solution.

EXAMPLE 4

Neutralize 100 grams of 15% by weight hydroxylamine in ethanol solution with 90% by weight nitric acid. The resulting HAN-ethanol-water slurry contains 43.6 grams of crystalline HAN and 89.1 grams of 95.4% by weight ethanol solution.

EXAMPLE 5

Neutralize 100 grams of 15% by weight hydroxylamine made using an 88% by weight aqueous ethanol solution (the normal azeotrope composition of aqueous ethanol) with 70% by weight nitric acid. The resulting HAN-ethanolwater slurry contains 43.6 grams of crystalline HAN and 100.3 grams of 74.9% by weight ethanol solution.

EXAMPLE 6

Neutralize 100 grams of 15% by weight hydroxylamine made using an 88% by weight aqueous ethanol solution with 90% by weight nitric acid. The resulting HAN-ethanol-water slurry contains 43.6 grams of crystalline HAN and 92.1 grams of 81.2% ethanol solution.

For all of the examples set forth above, refrigerated heat exchangers could be used to chill down the slurries to temperatures ranging from about −20° C. to about −50° C. (see Table 4 for examples). Then the chilled slurries could be filtered by, for example, a continuous centrifuge to recover the crystalline HAN. The aqueous alcohol filtrate could also be recovered through, for example, a continuous distillation apparatus for further use.

What is described are specific examples of many possible variations of the same invention and are not intended in a limiting sense. The claimed invention can be practiced using other variations not specifically described above.

What is claimed is:

1. A method of producing solid hydroxylamine nitrate, comprising the steps of:
   adding nitric acid to an alcoholic solution of hydroxylamine, having a concentration of over about 84% alchohol, to form solid hydroxylamine nitrate;
   chilling the resulting solution from about 20° C. to about −20° C.; and,
   filtering the solid hydroxylamine nitrate from a resulting solution.

2. The method of claim 1, wherein sufficient nitric acid is added so that the hydroxylamine within the alcoholic solution is substantially neutralized.

3. The method of claim 2, wherein the nitric acid comprises an aqueous solution comprising from about 60% by weight nitric acid to about 90% by weight nitric acid.

4. The method of claim 3, wherein the nitric acid comprises an aqueous solution comprising from about 60% by weight nitric acid to about 72% by weight nitric acid.

5. The method of claim 1, wherein an alcohol used in preparing the alcoholic solution of hydroxylamine comprises a lower molecular weight alcohol of from 1 to 3 carbon atoms.

6. The method of claim 5, wherein the alcohol comprises methanol.

7. The method of claim 5, wherein the alcohol comprises ethanol.

8. The method of claim 1, wherein the filtering comprises use of a centrifuge.

9. The method of claim 1, further comprising the step of distilling the resulting solution after separating the solid hyroxylamine nitrate to recover the alcohol.

10. The method of claim 1, wherein the alcoholic solution comprises a substantially anhydrous concentration.

* * * * *